(12) United States Patent
Ichikawa et al.

(10) Patent No.: US 6,519,837 B1
(45) Date of Patent: Feb. 18, 2003

(54) ASSEMBLY/PROCESSING APPARATUS

(75) Inventors: Hideki Ichikawa, Inazawa (JP); Koji Katahira, Chita (JP); Norihisa Tsuchiyama, Okazaki (JP)

(73) Assignee: Denso Corporation, Kariya (JP)

( * ) Notice: Subject to any disclaimer, the term of this patent is extended or adjusted under 35 U.S.C. 154(b) by 206 days.

(21) Appl. No.: 09/669,731

(22) Filed: Sep. 26, 2000

(30) Foreign Application Priority Data

Sep. 27, 1999 (JP) ............................................. 11-272012
Apr. 17, 2000 (JP) ........................................ 2000-115432

(51) Int. Cl.7 ................................................. B23P 21/00
(52) U.S. Cl. .............................. 29/720; 29/784; 29/786; 29/787
(58) Field of Search ......................... 29/720, 709, 784, 29/789, 787, 791, 795; 82/118, 124, 133

(56) References Cited

U.S. PATENT DOCUMENTS 4,674,181 A * 6/1987 Hamada et al. .......... 198/339.1
4,783,904 A * 11/1988 Kimura .................... 198/465.2
5,319,845 A * 6/1994 Watanabe et al. ............. 29/701
5,586,387 A * 12/1996 Nakatani et al. .............. 29/703
5,692,867 A * 12/1997 Kondo et al. ................ 414/268

* cited by examiner

*Primary Examiner*—Henry Tsai
(74) *Attorney, Agent, or Firm*—Harness, Dickey & Pierce, PLC (57) ABSTRACT

An Assembly/processing apparatus includes part tray, work tray where work pieces are placed, conveyor, base machine, part-tray lane, work-tray lane, part-tray transfer apparatus and work-tray transfer apparatus. Conveyor conveys part trays and work trays together, base machine includes assembling means for assembling parts to a work piece, and part tray lane and work tray lane are provided on base machine. Conveyor conveys part trays and work trays to base machine, and respectively places them on each of part tray lane and work tray lane. Then, assembling means takes parts from part tray, and assembles them to the work piece on work tray.

11 Claims, 7 Drawing Sheets

ASSEMBLY/PROCESSING APPARATUS

CROSS-REFERENCE TO RELATED APPLICATION

The present invention is related to Japanese patent application No. Hei. 11-272012, filed Sep. 27, 1999; No. 2000-115432, filed Apr. 17, 2000; the contents of which are incorporated herein by reference.

FIELD OF THE INVENTION

The present invention relates generally to an assembly/processing apparatus, and more particularly, to an assembly/processing apparatus for an assembly/processing line having an easily changeable equipment capacity in response to production fluctuation, change of assembly/processing steps or the like.

BACKGROUND OF THE INVENTION

Figure 11:
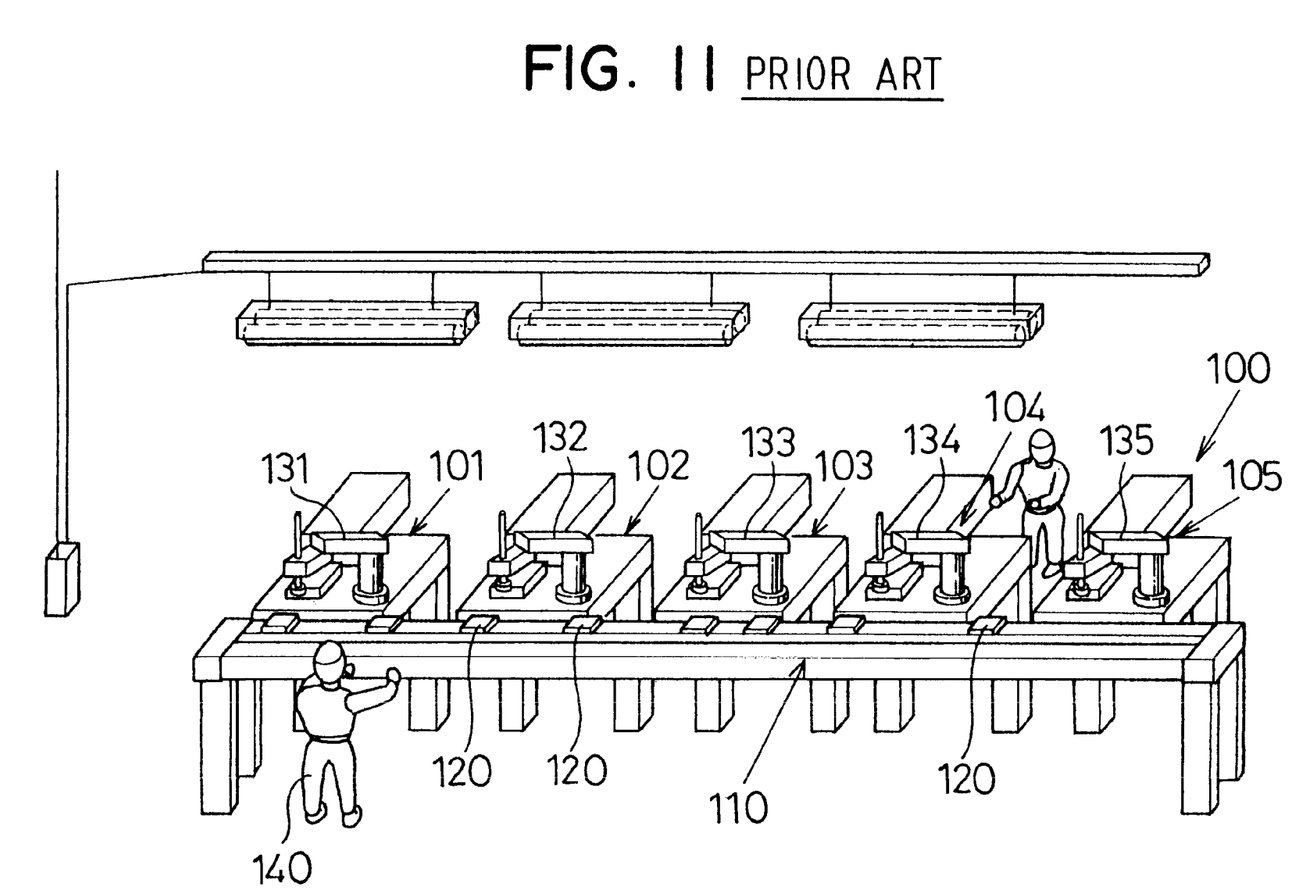
FIG. 11 is a perspective view for an assembly/processing apparatus according to the prior art.

An assembly/processing apparatus is composed of a series of automated line equipment, which assembles a product with numerous manufacturing steps. As shown in FIG. 11, conventional automated-line equipment 100 is composed of base machines 101–105 for assembling/processing, conveying means 110 such as a belt conveyor, work pallets 120, assembling means 131–135 such as loaders and robots and part suppliers 140. Conveying means 110 conveys parts and work pieces (a main part, to which other parts are assembled and becomes a product) with base machines 101–105.

However, conventional assembly/processing apparatuses have the following problems:

(a) Specialized part supplying devices must be prepared for each part for a specific product change. Therefore, initial setup is complicated, thereby increasing setup time and setup cost.

(b) In general, processing is performed on the front side of the assembly/processing line and part supply is performed on the back side thereof. Therefore, workers are positioned apart, making it difficult to assemble work.

(c) For the assembly/processing apparatus disposed along the assembly/processing line, different equipment is required during manual production time and all automated production time. Therefore, excessive investment is sometimes required.

When there is a change in the layout of the automated line equipment, primary wiring, secondary wiring and piping, fluorescent lamp movement and the like is complicated. Therefore, increased labor and longer manufacturing time is required. Also, because primary and secondary wiring and piping is laid between the base machines and other apparatuses such as the conveyor and fluorescent lamps, when line equipment is moved, the wiring and piping must be newly laid.

SUMMARY OF THE INVENTION

In view of these and other drawbacks, the present invention provides an assembly device that does not require a work tray lane and device for transferring the work tray on the conveying means to the work tray lane. In another aspect of the invention, when a work tray reaches a predetermined position on a conveying means, the conveying means is temporarily stopped. Therefore, an industry robot can easily assemble parts on the part tray, located on the part tray lane, to the work piece on the work tray located on the conveying means.

In still another aspect of the invention, the industry robot can perform both functions of the part-tray transfer means and the work-tray transfer means. The part-tray transfer means selectively transfers the part tray from the conveying means to the part tray lane. The work-tray transfer means selectively transfers the work tray from the conveying means to the work tray lane. Therefore, the transfer means is not required.

In another aspect of the invention, a specialized part supplying means is not required to be respectively prepared for each kind of part assembled, and specialized work supplying means is not required to be respectively prepared for each kind of work piece. In the assembly/processing line using this assembly/processing apparatus, the operators for the assembly/processing apparatus can be collectively arranged around the front of the line equipment or the top step thereof, thereby easily reducing loss due to operator arrangement. The work-tray transfer means and a processing apparatus for only processing can be provided around a work tray lane. Accordingly, after the work-tray transfer means transfers a work tray to the processing apparatus and the processing apparatus processes the work piece on the work tray in a predetermined manner, the work-tray transfer means again transfers the work tray to the work tray lane. As a result, various kinds of processing can be sequentially performed with the same equipment.

In another aspect of the invention, the assembling means is an industry robot, and the industry robot shares at least any one of part-tray transfer means and work-tray transfer means.

In another aspect, the width of the part tray and work tray are approximately identical to the width of conveying means. As such, the trays can be easily placed, conveyed and taken out. Large-sized parts can be placed on a work tray together with work pieces. Since only small amounts of large-sized parts can be placed on a part tray, numerous part trays are required by the conveying means, thereby naturally reducing line working-ratio. However, if large-sized parts are placed on a work tray together with work pieces, the line working-ratio increases. Further, the parts, which have numerous special parts and small number parts, require complex control such as a match between a part and a number on a part tray. However, if these parts are respectively placed on each work tray where they are assembled, false assembly or the like can be prevented. Plural part trays can be placed on a tray lane, and plural different parts are assembled on the same assembly/processing apparatus. Accordingly, numerous specialized part-supply apparatuses are not required to be disposed on one assembly/processing apparatus, and one base machine can assemble numerous kinds of parts.

In another aspect, the conveying means includes a primary input apparatus for a power source such as for an electrical system and a plant air system. Wiring and piping are laid along almost the entire length of the conveying means. Further, the conveying means includes secondary output connectors at suitable positions. Therefore, the equipment can be increased or decreased in response to production-amount fluctuation, and primary and secondary wiring and piping can be easily applied after equipment movement. The conveying means can also include beams on which light sources such as fluorescent lamps are disposed. Therefore, the amount of equipment can be easily increased or decreased in response to production-amount fluctuation, and wiring for light sources such as fluorescent lamps can be easily provided after equipment movement. Further areas of applicability of the present invention will become apparent from the detailed description provided hereinafter. It should be understood that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein.

A first embodiment of the present invention will be described hereinafter with reference to accompanying drawings. Assembly/processing apparatus 10, shown in FIG. 1, includes conveyor 1 such as a belt conveyor for conveying parts 11 and work pieces 12 (main parts to which part 11 is assembled shown in FIG. 2B). Base machine 2 for assembling and processing is disposed on the back side of conveyer 1 and adjacent thereto.

Figure 1:
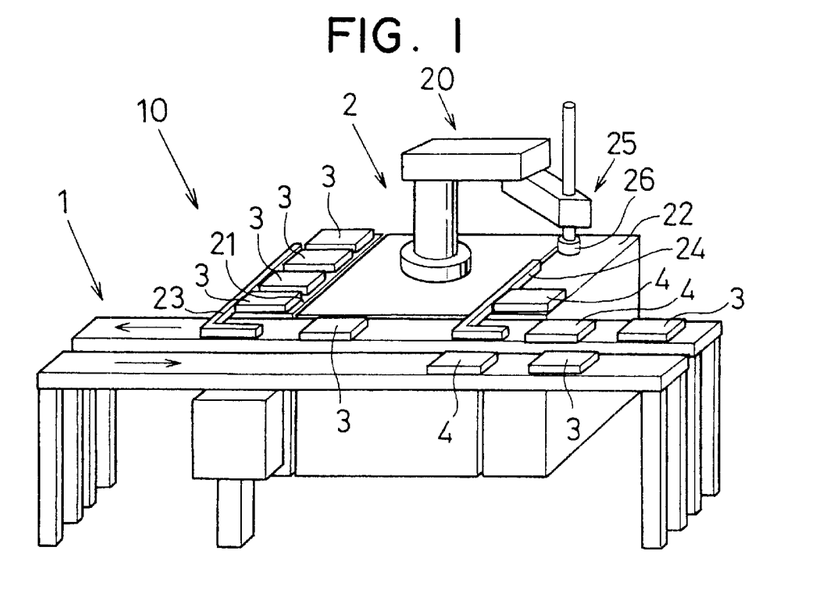
FIG. 1 is a perspective view of an assembly/processing apparatus according to the present invention.

Base machine 2 includes assembling means 20 which grasps part 11, and transfers and assembles it to work piece 12. Assembling means 20 includes a loader and a servomotor driven by an industrial robot or an air cylinder. For complicated assembling-work, it is preferable to use the industrial robot having higher flexibility as assembling means 20.

Figure 2A:
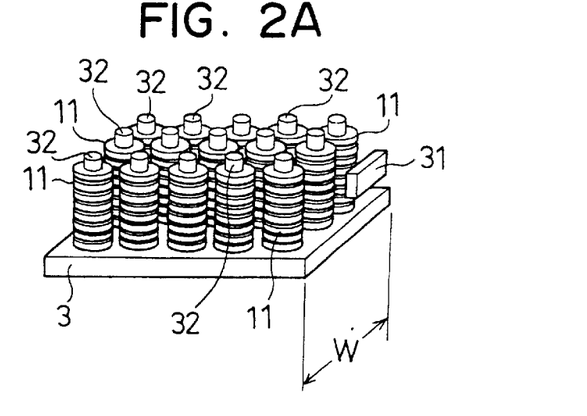
FIG. 2A is a perspective view of a part tray and a work tray for an assembly/processing apparatus according to the present invention.
Figure 2B:
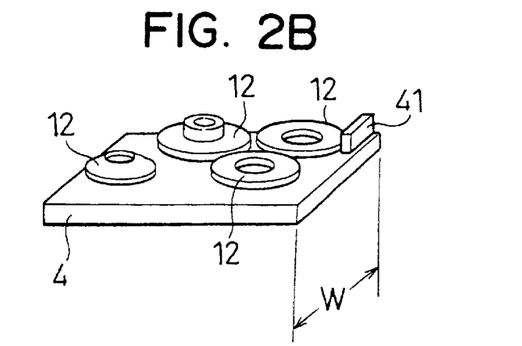
FIG. 2B is a perspective view of a part tray and a work tray for an assembly/processing apparatus according to the present invention.

Conveyor 1 conveys part tray 3 on which parts 11 are arranged and work tray 4 on which work pieces 12 are placed together. As shown in FIG. 2, indications 31, 41 such as an ID tag for indicating a name, a number or the like are respectively attached to each of these part trays 3 and work trays 4. Part trays 3 and work trays 4 are suitably loaded on conveyor 1 from a loading position provided on a predetermined position such as the top of conveyor 1.

Preferably, part trays 3 and work trays 4 are approximately identical to each other in dimension. As such, at least width W is preferably the same in a direction perpendicular to a conveying direction. However, part trays 3 and work trays 4 can be different. However, if they are identical to each other in width along the conveying direction, a common mechanism can be used for holding and positioning each of trays 3, 4, thereby simplifying conveyor 1.

Part tray lane 21 on which part trays 3 are placed is provided on one side of base machine 2. Work tray lane 22 on which work trays 4 are placed is provided on the other side thereof. On part tray lane 21, part-tray transfer apparatus 23 is disposed. Part-tray transfer apparatus 23 transfers part tray 3 from conveyor 1 to part tray lane 21 while selectively holding part tray 3 on conveyor 1. Further, part-tray transfer apparatus 23 transfers the part tray on which no one is placed from part tray lane 21 onto conveyor 1.

On work tray lane 22, work-tray transfer apparatus 24 is disposed. Work-tray transfer apparatus 24 transfers work tray 4 from conveyor 1 to work tray lane 22 while suitably holding work tray 4 on conveyor 1. Further, work-tray transfer apparatus 24 transfers the work tray, on which work pieces 12 to which the assemblies of parts 11 are completed are placed, from work tray lane 22 onto conveyor 1. In this embodiment, part 11 is assembled to work piece 12 on work tray 4 located on work tray lane 22.

On part tray 3, predetermined one or more kinds of parts 11 are arranged with positioning means 32. Positioning means 32 has a positioning pin as shown in the drawing, periphery-holding means of part 11 provided on part tray 3 or other mechanism for holding a part at a predetermined position.

On work tray 4, the minimum number of work pieces 12 for assembly are placed. It is sometimes convenient that one or more kinds of parts 11 are placed together with work pieces 12 on work tray 4. These parts 11, placed on work tray 4 together with work pieces 12, are preferable to parts with reduced supplying efficiency on part tray 3 due to a larger outside diameter. Further, theses parts 11 are also preferable for the following numerous kinds of parts. The parts respectively assembled to each work piece, whose number are different from one another, are different.

Parts 11, arranged on a part tray 3, are assembled. No one part is placed thereon. Then, in general, the empty part tray is transferred from part tray lane 21 to conveyor 1 and transferred outside. However, if assembling means 20 or a robot is used as empty-tray transfer means, the structure of part-tray transfer apparatus 23 or the like can be simplified. In this case, preferably a support guide, which can be supported with hand 25 of assembling means 20 such as a robot, is provided at the outline portion or the center portion of part tray 3.

If hand 25 of assembling means 20 includes chuck head 26 for supporting different kinds of parts 11 or a tool change mechanism, parts 11 can be assembled by one apparatus, thereby miniaturizing assembly/processing line equipment. Parts 11 are assembled as follows. Plural part trays 3, on which plural different parts 11 are arranged, are located on part tray lane 21. Similarly, work trays 4, on which work pieces 12 are arranged, are located on work tray lane 22. Required part 11 is transferred to work piece 12 on work tray 4 while supported by hand 25 of assembling means 20 and assembled to its predetermined position. Then, another part 11 is similarly assembled to work piece 12, and this work is repeated. Work piece 12, to which all required parts 11 have been assembled, is transferred to conveyor 1 together with work tray 4 by work-tray transfer apparatus 24.

Figure 3:
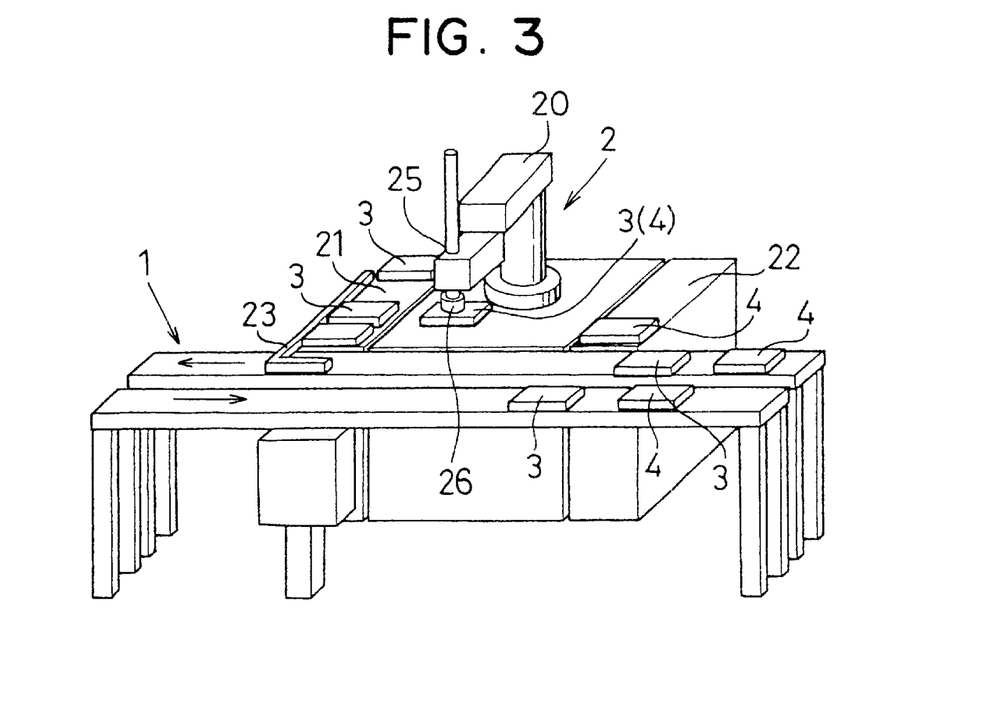
FIG. 3 is a perspective view for an assembly/processing apparatus according to the present invention.

FIG. 3 shows assembly/processing apparatus 10 according to a second embodiment of the present invention. In this embodiment, empty part trays 3 are transferred by hand 25 of assembling means 20 from part tray lane 21 to conveyor 1. As shown in the drawing, work-tray transfer apparatus 24 is eliminated, and work trays 4 are transferred by hand 25 of assembling means 20 between conveyor 1 and work tray lane 22.

Figure 4:
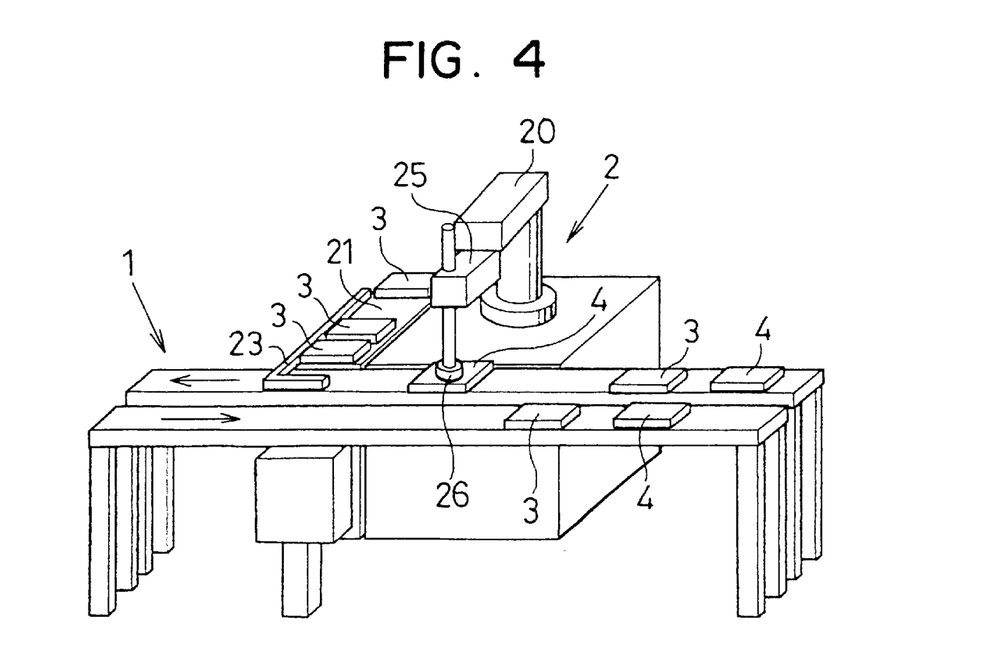
FIG. 4 is a perspective view of an assembly/processing apparatus according to the present invention.

In a third embodiment shown in FIG. 4, work tray lane 22 and work-tray transfer apparatus 24 are eliminated, and parts are assembled on work tray 4 and placed on conveyor 1. In this case, when work tray 4 is transferred to a predetermined position around base machine 2, the transfer of work tray 4 is stopped. While stopped, parts 11 are assembled on work tray 4. The transfer of work tray 4 can be stopped by the intermittent operation of conveyor 1. This stopping can be performed by catching and sliding work tray 4 on conveyor 1 with hand 25 of assembling means 20 or catching means (not shown) provided specially.

Figure 5:
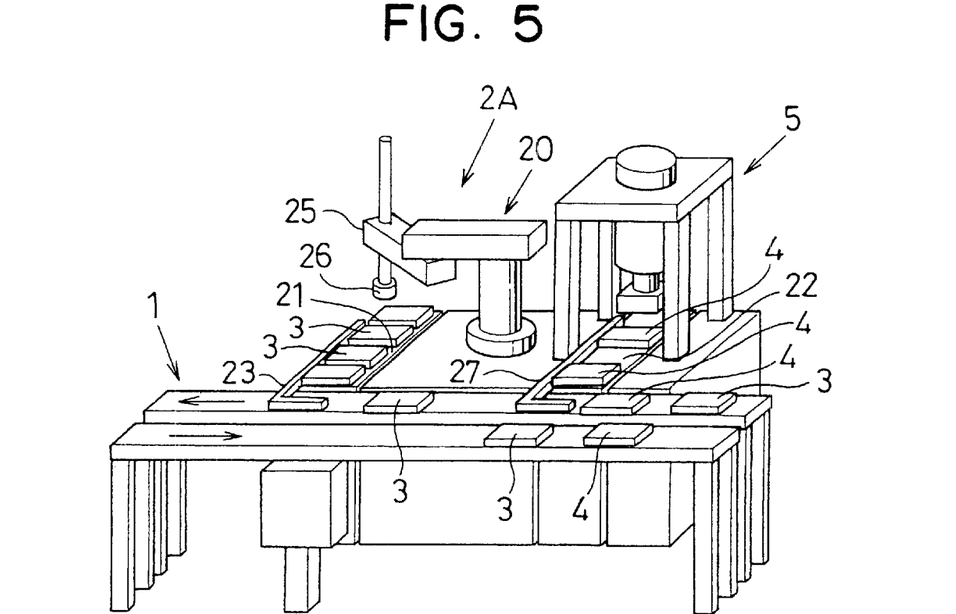
FIG. 5 is a perspective view for an assembly/processing apparatus according to the present invention.
Figure 6:
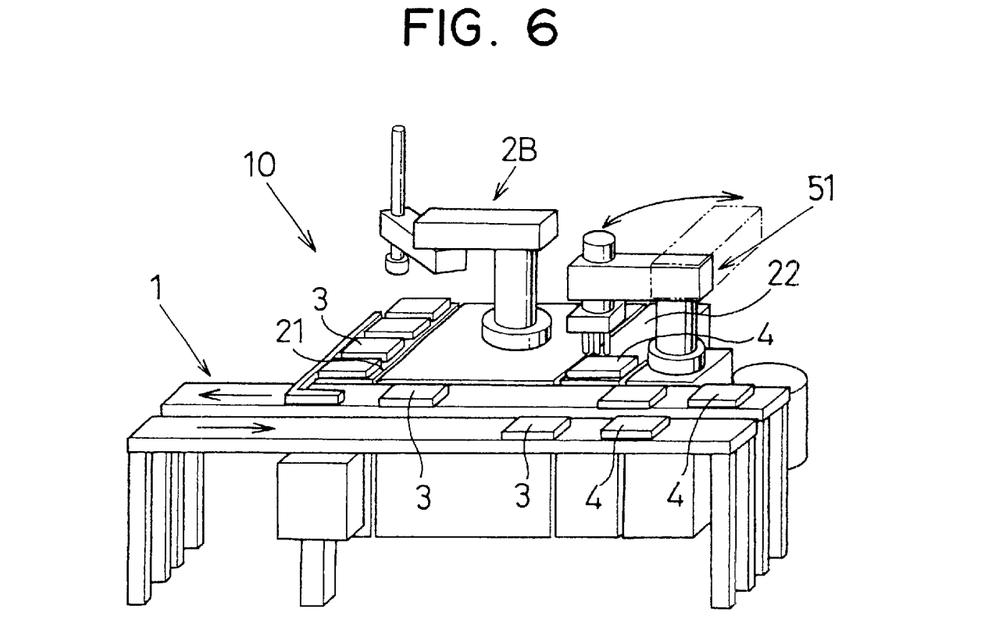
FIG. 6 is a perspective view for an assembly/processing apparatus according to the present invention.

In a fourth embodiment shown in FIG. 5 and a fifth embodiment shown in FIG. 6, a composite assembly/processing apparatus can perform more kinds of assembly/processing than assembly/processing apparatus 10. In base machine 2A shown in FIG. 5, transfer means 27 for work tray 4 and processing apparatus 5 (not for assembly but for insertion, pressurization or application of grease) is disposed around work tray lane 22. Work tray 4 is transferred by transfer means 27 to processing apparatus 5, and is processed in a predetermined manner. Thereafter, work tray 4 is again transferred by transfer means 27 to work tray lane 22. Base machine 2B shown in FIG. 6, equipped with processing apparatus 51 including a robot and can perform complicated processing without assembly.

Figure 7:
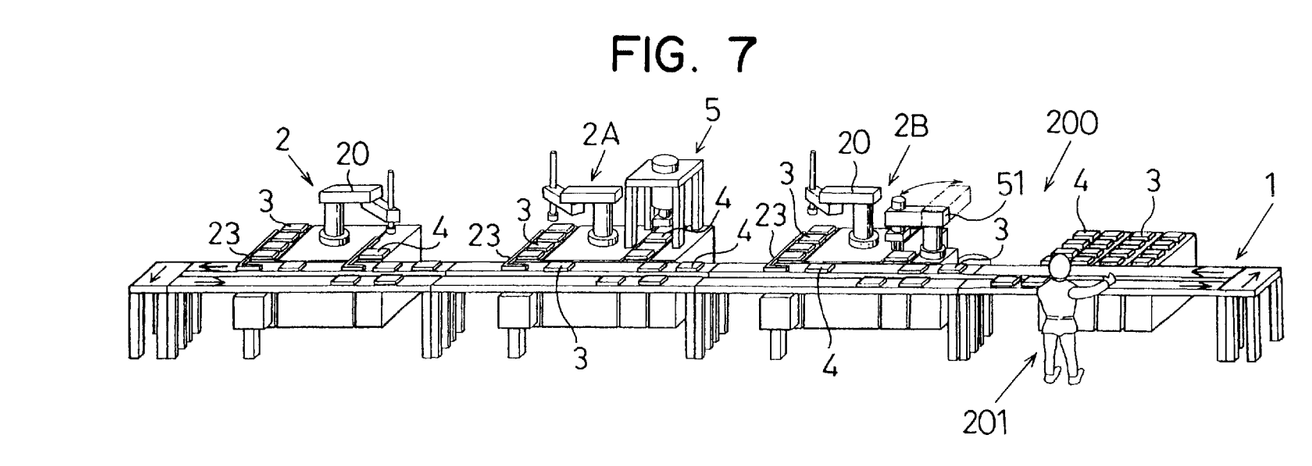
FIG. 7 is a perspective view for an assembly/processing apparatus according to the present invention.
Figure 8:
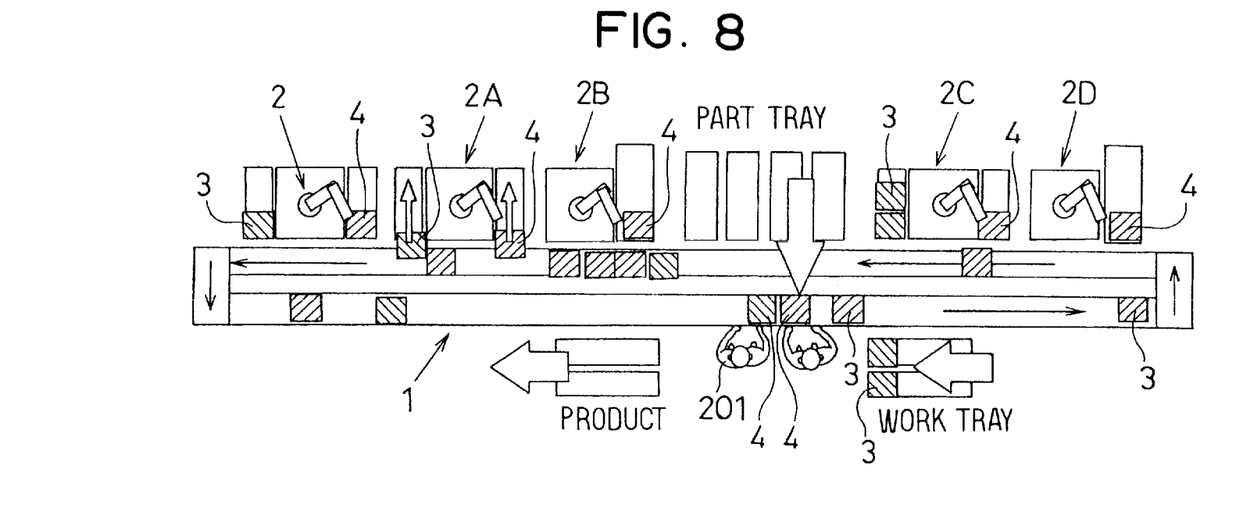
FIG. 8 is a schematic view for an assembly/processing apparatus according to the present invention.

FIGS. 7, 8 show assembly/processing line 200 where base machines 2, 2A, 2B, 2C, 2D are disposed in a line parallel to conveyor 1. In assembly/processing line 200, operator 201 is disposed at one end of the line equipment. Operator 201 places part trays 3 and work trays 4 onto the line, and takes empty part trays 3 and empty work trays 4 from the line. In this manner, operators required for assembly/processing line 200 can be collectively arranged as such, so that the number of the operators can be easily reduced.

Figure 9:
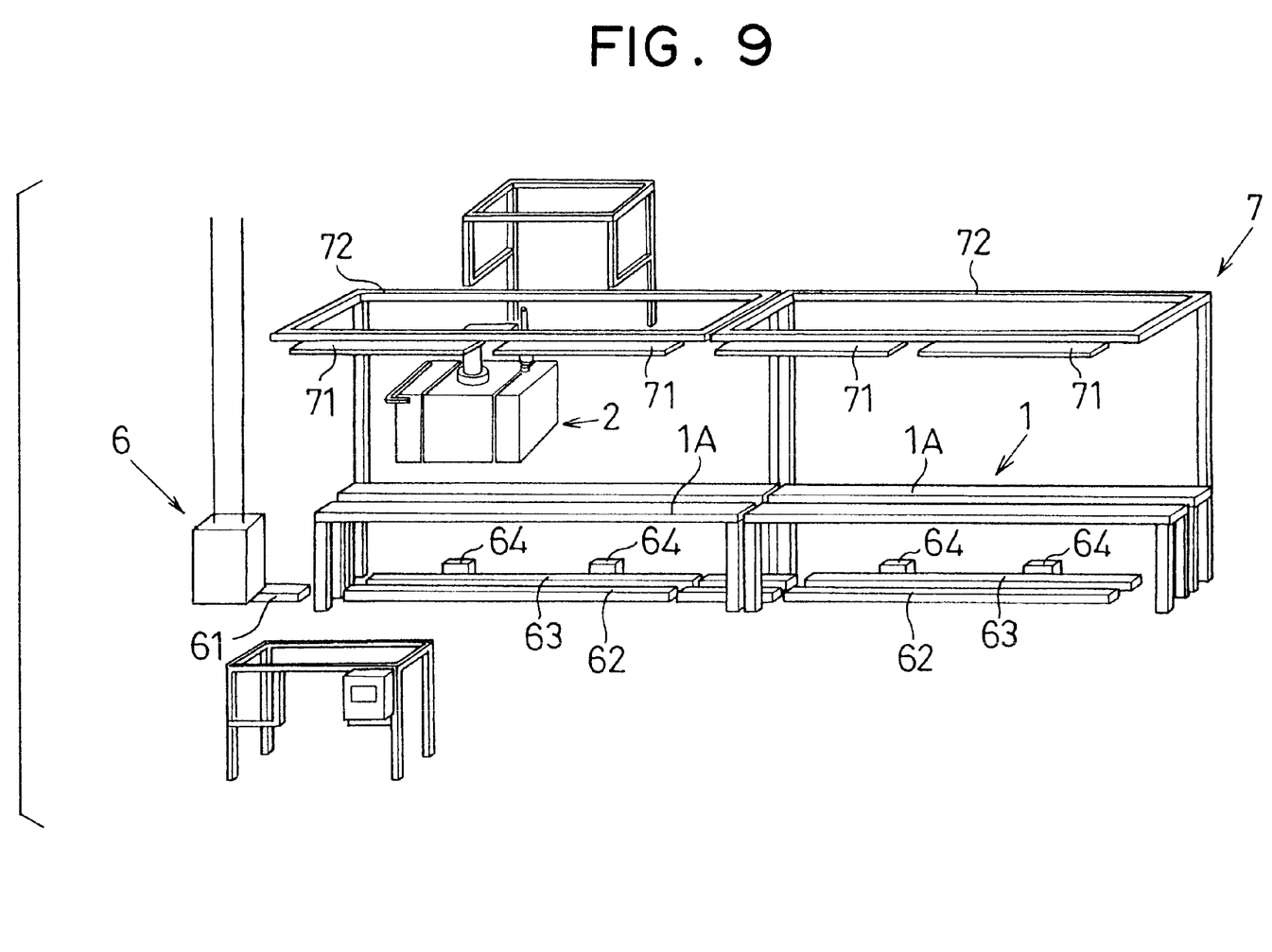
FIG. 9 is a schematic view showing an assembly/processing line.

In FIG. 9, primary input apparatus 61 of power source 6 for an electrical system and a plant air system is provided, and wiring 62 and piping 63 are laid along almost the length of conveyor 1. Further, secondary connectors 64 are disposed in many places. Accordingly, the equipment can be easily increased or decreased in response to production-amount fluctuation. Further, when the equipment is moved, primary and secondary wiring and piping can be easily provided.

In FIG. 9, further, light sources 7 such as fluorescent lamps 71 are respectively disposed for belt conveyor 1A of conveyor 1. For each belt conveyor 1A, fluorescent-lamp disposition beams 72 are provided, and a power source for fluorescent lamps is supplied through secondary connectors 64 of conveyor 1, such as a belt conveyor. Therefore, the equipment can be increased or decreased in response to production-fluctuation. Further, when the equipment is moved, wiring of light source 7 such as fluorescent lamps 71 can be easily provided.

Figure 10:
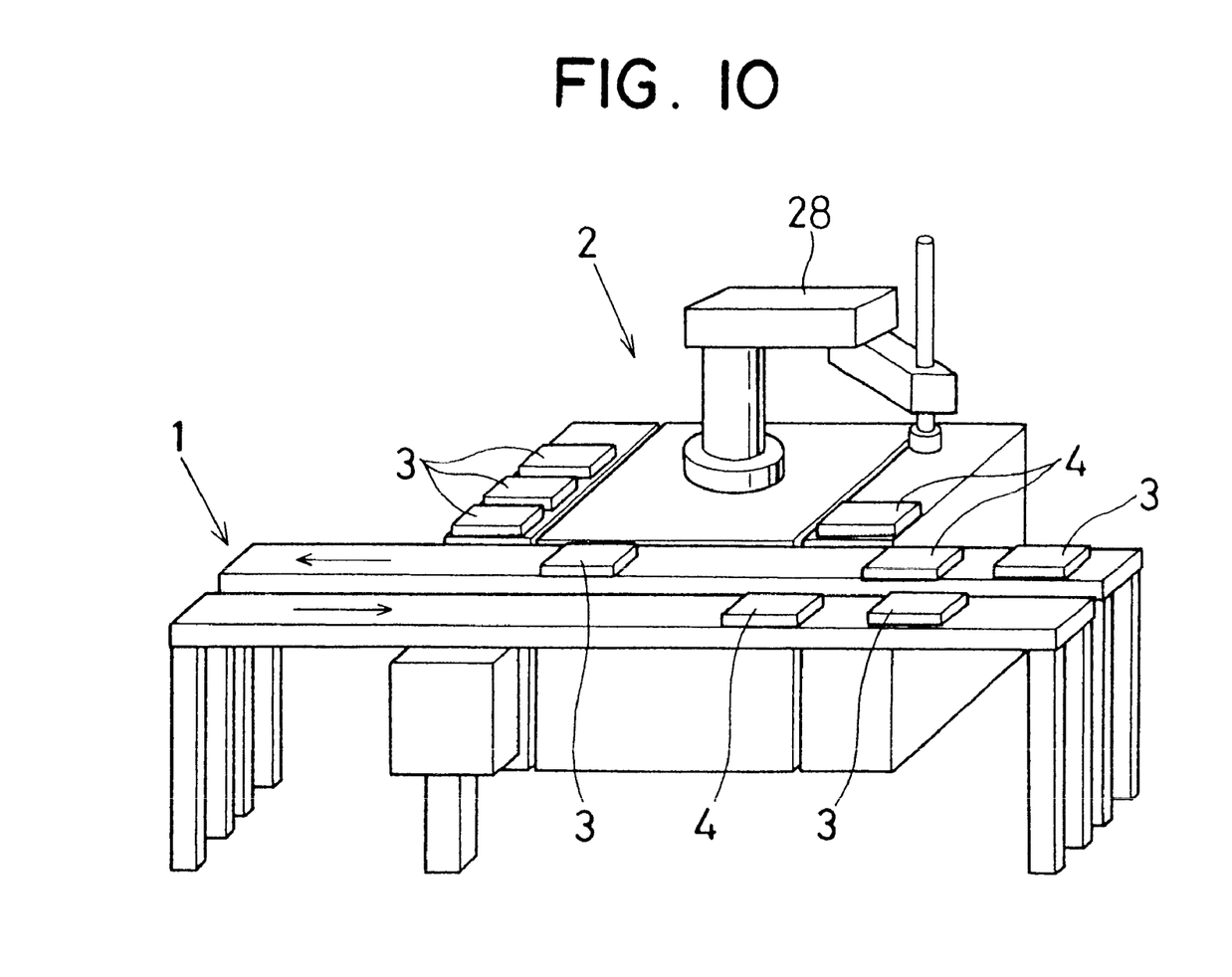
FIG. 10 is a perspective view for an assembly/processing apparatus according to the present invention.

As shown in FIG. 10, industry robot 28 can be used. Industry robot 28 can move in a range including the locations of where part trays 3 and work trays 4 are placed, the position where these trays are taken, the position where they are stored, and the position where parts are assembled.

Accordingly, industry robot 28 can share part-tray transfer 23 (FIGS. 1, 3, 4, 5), work-tray transfer 24 (FIG. 1) and transfer means 27 (FIG. 5). Therefore, these functions can be integrated into industry robot 28. Further, a horizontal articulated robot or a horizontal movable robot can be used as industry robot 28.

When plural processing apparatuses for the same step are disposed in parallel, not only two belt conveyors (a tray-sending belt conveyor and a tray-returning belt conveyor) but also plural tray-sending belt conveyors can be disposed, thereby preventing the reduction of working ratio due to the mutual interference between the apparatuses.

Specially, when plural apparatuses having the same function are disposed, conveying means are constructed so that one work tray can pass another work tray to prevent apparatus stopping due to the mutual interference between the apparatuses. For example, two tray-sending belt conveyors and three tray-returning belt conveyors are disposed.

For realizing a higher-speed assembly/processing apparatus, the work tray lane to which work trays are transferred can be eliminated. For example, the parts can be assembled to the work piece on the work tray while the tray is temporarily positioned on the belt conveyor.

While the above-described embodiments refer to examples of usage of the present invention, it is understood that the present invention may be applied to other usage, modifications and variations of the same, and is not limited to the disclosure provided herein.

What is claimed is:

1. An assembly/processing apparatus comprising:
   a part tray on which parts required for assembly are placed;
   a work tray on which work pieces required for assembly are placed;
   a conveying device including at least one conveyor that conveys said part tray and said work tray together on the same conveyor;
   a base machine disposed around said conveying device, the base machine including an industry robot for assembling said part to said work piece; and
   a part tray lane for accommodating a single line of parts that is perpendicular to said conveyor device and on said base machine, wherein:
     said industry robot selectively transfers said part tray from said conveying device to said part tray lane;
     said industry robot transferring said part tray to said part tray lane when said conveying device conveys said part tray around said base machine; and
     said industry robot assembling said part from said part tray to the work piece on said work tray, said work tray located on the conveying device.

2. The assembly/processing apparatus according to claim 1, wherein:
   said conveying device temporarily stops when said work tray reaches a predetermined position; and
   when said work tray reaches the predetermined position and said conveying device is temporarily stopped, said industry robot assembles said part on said part tray to the work piece.

3. An assembly/processing apparatus comprising:
   a part tray on which parts required for assembly are placed;
   a work tray on which work pieces required for assembly are placed;
   a conveying device including at least one conveyor for conveying said part tray and said work tray together on the same conveyor;

a base machine disposed around said conveying device, the base machine including an industry robot for assembling said part to said work piece;

a part tray lane for accommodating a single line of parts that is perpendicular to said conveying device and on said base machine; and a work tray lane for accommodating a single line of parts that is perpendicular to said conveying device and on said base machine, wherein:

said industry robot selectively transfers said part tray from said conveying device to said part tray lane;

said industry robot selectively transfers said work tray from said conveying device to said work tray lane;

when said conveying device conveys said part tray and said work tray around said base machine, said industry robot respectively transfers said part tray and said work tray from said conveying device to each of said part tray lane and said work tray lane; and said industry robot takes the part from said part tray and assembles said part to the work piece on said work tray.

4. An assembly/processing apparatus comprising:

a part tray on which parts required for assembly are placed;

a work tray on which work pieces required for assembly are placed;

a conveying device including at least one conveyor for conveying both of said part tray and said work tray together on the same conveyor;

a base machine disposed around said conveying device, the base machine including assembling means for assembling said part to said work piece;

a part tray lane for accommodating a single line of parts that is perpendicular to said conveying device and on said base machine;

a work tray lane for accommodating a single line of parts that is perpendicular to said conveying device and on said base machine;

part-tray transfer means for selectively transferring said part tray from said conveying device to said part tray lane; and work-tray transfer means for selectively transferring said work tray from said conveying device to said work tray lane, wherein:

when said conveying device conveys said part tray and said work tray around said base machine, said transfer means respectively transfers said part tray and said work tray from said conveying device to each of said part tray lane and said work tray lane; and said assembling means takes the part from said part tray and assembles said part to the work piece on said work tray.

5. The assembly/processing apparatus according to claim 4, wherein:

said work-tray transfer means and a processing apparatus for only processing are provided around said work tray lane; and after said work-tray transfer means transfers said work tray to said processing apparatus and said processing apparatus processes said work piece on said work tray in a predetermined manner, said work-tray transfer means again transfers said work tray to said work tray lane.

6. The assembly/processing apparatus according to claim 4, wherein:

said assembling means is an industry robot; and said industry robot shares at least said part-tray transfer means or said work-tray transfer means.

7. The assembly/processing apparatus according to claim 1, wherein:

the width of said part tray and the width of said work tray are substantially identical to the width of said conveying device.

8. The assembly/processing apparatus according to claim 7, wherein a portion of parts are placed on said work tray together with work pieces.

9. The assembly/processing apparatus according to claim 8, wherein:

a plurality of part trays are placed on said part tray lane; and a plurality of different parts are assembled to said work piece.

10. The assembly/processing apparatus according to claim 9, wherein:

said conveying device includes a primary input apparatus for a power source for an electrical system and a plant air system;

wiring and piping are laid along substantially an entire length of said conveying device; and said conveying device includes secondary output connectors.

11. The assembly/processing apparatus according to claim 10, wherein said conveying device includes a light-source disposition beam.

* * * * *